US011249632B2

(12) United States Patent
Ji et al.

(10) Patent No.: US 11,249,632 B2
(45) Date of Patent: Feb. 15, 2022

(54) PRESENCE, ACCESS, AND SEEN STATE FOR LOCAL COPIES OF SHARED CONTENT ITEMS

(71) Applicant: DROPBOX, INC., San Francisco, CA (US)

(72) Inventors: Erika Ji, New York, NY (US); Eric Shen, New York, NY (US); Matt Hiller, Brooklyn, NY (US); Matt Kim, Brooklyn, NY (US); Peter Hua, New York, NY (US); Matthew Spitz, Brooklyn, NY (US); Kimberly Watkins, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/598,195

(22) Filed: Oct. 10, 2019

(65) Prior Publication Data

US 2020/0042165 A1 Feb. 6, 2020

Related U.S. Application Data

(63) Continuation of application No. 15/395,088, filed on Dec. 30, 2016, now Pat. No. 10,481,781.

(51) Int. Cl.
*G06F 3/0482* (2013.01)
*G06F 3/04847* (2022.01)
(Continued)

(52) U.S. Cl.
CPC ........ *G06F 3/04847* (2013.01); *G06F 3/0482* (2013.01); *G06F 16/93* (2019.01);
(Continued)

(58) Field of Classification Search
CPC .... G06F 3/04847; G06F 16/93; G06F 3/0482; G06F 21/6218; H04L 67/1095; H04L 63/101; G06Q 10/103
See application file for complete search history.

(56) References Cited

U.S. PATENT DOCUMENTS 7,849,213 B1 * 12/2010 Borghetti ................ H04L 63/20
707/609
8,112,715 B2 2/2012 Cragun et al.
(Continued)

FOREIGN PATENT DOCUMENTS

JP 2002297599 A 10/2002
JP 2005346494 A 12/2005
(Continued)

OTHER PUBLICATIONS

PCT Search Report and Written Opinion dated Feb. 26, 2018 in related PCT Application No. PCT/US2017/058481, filed Oct. 26, 2017 to Dropbox, Inc., 12 pages.
(Continued)

*Primary Examiner* — Andrey Belousov
(74) *Attorney, Agent, or Firm* — Polsinelli PC

(57) ABSTRACT

The present technology displays an access list, seen state information, and presence information for content items stored and managed by a content management system. Advantageously, the present technology does not require users to view or work on content items within the content management system—they can work on content items natively on their own computing device.

17 Claims, 16 Drawing Sheets

(51) Int. Cl.
    *G06F 21/62*     (2013.01)
    *H04L 29/06*     (2006.01)
    *H04L 67/1095*     (2022.01)
    *G06F 16/93*     (2019.01)
    *G06Q 10/10*     (2012.01)

(52) U.S. Cl.
    CPC ....... *G06F 21/6218* (2013.01); *G06Q 10/103* (2013.01); *H04L 63/101* (2013.01); *H04L 67/1095* (2013.01)

(56) References Cited

U.S. PATENT DOCUMENTS

| | | | |
|---|---|---|---|
| 8,701,014 | B1 | 4/2014 | Schlegel et al. |
| 9,189,533 | B2 | 11/2015 | Wautier et al. |
| 9,413,708 | B1 | 8/2016 | Michael et al. |
| 2006/0156255 | A1 | 7/2006 | Bedingfield |
| 2013/0159858 | A1* | 6/2013 | Joffray .............. H04N 21/4307 715/719 |
| 2013/0283207 | A1* | 10/2013 | Dukhon ............... G06F 3/0482 715/808 |
| 2014/0289803 | A1* | 9/2014 | Sharma ................ H04M 15/44 726/4 |
| 2015/0135097 | A1 | 5/2015 | Carriero et al. |
| 2015/0288756 | A1 | 10/2015 | Larabie-Belanger |
| 2015/0288775 | A1 | 10/2015 | Larabie-Belanger |
| 2016/0259508 | A1 | 9/2016 | Eccleston et al. |
| 2016/0360012 | A1 | 12/2016 | Zholudev et al. |

FOREIGN PATENT DOCUMENTS

| | | |
|---|---|---|
| JP | 2007272492 A | 10/2007 |
| JP | 2016537746 A | 12/2016 |
| WO | 2009125571 A1 | 10/2009 |

OTHER PUBLICATIONS

First Examination Report for Australian Application No. 2017387669 dated Sep. 5, 2019, 2 pages.
Examination Report No. 2, for Australian Application No. 2017387669, dated Feb. 3, 2020, 4 pages.
Communication Pursuant to Article 94(3) EPC for European Application No. 17835956.8 dated Apr. 15, 2020, 5 pages.
Notice of Acceptance for Australian Application No. 2017387669 dated May 27, 2020, 3 pages.
Notification of Reason for Refusal for Japanese Application No. 2019-512897 dated Aug. 21, 2020, 11 pages.

* cited by examiner

FIG. 7

Fran's View

*No ACL Access*

656

Christine's View

About Acme Co.pptx
3 Members

To: Email, name, or group  [Comment]

- Anyone with the link can view this file  Change
  - You Viewing now
- Alice Adams • Viewing now
  alice@acme.com
- Bob Parker • Viewing now
  bob@acme.com
- 1 person outside of your
  Dropbox team • Never Viewed

Alice & Bob's View

- Alice = Owner (team)
- Bob = Editor (team)
- Christine = Commenter (team)
- Fran = Viewer (Link)

About Acme Co.pptx
3 Members

To: Email, name, or group  [Comment]

- Anyone with the link can view this file
  - Christine Silva
    Viewed yesterday
- You • Viewing now
  alice@acme.com
- Bob Parker • Viewing now
  bob@acme.com
- Fran Muller • Never viewed
  fran@pygmy.com •
  Outside of your Dropbox team

File Name.docx
53 Members · Visibility options ← 702

To: Email, name, or group          706          [Can view ▾]   ✕

Create a link

- No link created
- Acme Co.
  50 members
- You · Viewing now
  you@acme.com
- Carmen Silva · Jul 1 at 9
  carmen@acme.com
- Ben Parker · Never View
  ben@acme.com

---

Documents
53 Members · Visibility options ← 708          [Can edit ▾]   ✕

To: Email, name, or group

Create a link

- No link created yet                                            Can edit ▾
- Acme Co.                                                       Can view ▾
  50 members                                                     Can edit ▾
                                                                 Owner

---

Visibility options                                           ✕

710

Display information about who has   ⦿ Yes
viewed or edited this file/files in  ○ No
this folder?

[ Save setting ]    [ Cancel ]

FIG. 10B

PRESENCE, ACCESS, AND SEEN STATE FOR LOCAL COPIES OF SHARED CONTENT ITEMS

CROSS-REFERENCE TO RELATED APPLICATIONS

This application is a continuation of U.S. application Ser. No. 15/395,088, filed on Dec. 30, 2016, the content of which is incorporated herein by reference.

BACKGROUND

Collaboration has always been a central activity to just about any organization. Today many tools exist to help teams collaborate on just about any type of project. At the center of many projects are documents that need to be accessed, shared, modified, etc. by team members and collaborators.

However, even with these tools team members, and even document creators, often ask whether other team members have viewed their work product, or may even ask, which team members are on a project.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 7 illustrates an example graphical user interface for enabling seen state information in association with a content item;

FIG. 9B illustrates an example graphical user interface for displaying an access control list with presences and seen state information to members of the access control list and members accessing a content item using a link;

FIG. 9D illustrates another example view for accessing presence and seen state information;

FIG. 10A illustrates an example graphical user interface for enabling or disabling display of seen state;

FIG. 10B illustrates an example graphical user interface for enabling or disabling views of authorized viewers of a collection;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art to give collaborators better visibility into whom has access to the work product of the collaborators and visibility into when any one of the collaborators last viewed work product of the collaborators. Specifically, one problem that plagues teams is when a team member does not know if other team members have reviewed a content item. A common scenario is that a first team member will work on a content item and send the content item via email to other team members. However, the first team member will not get a response. The first team member does not know if other team members have viewed the content item and just didn't have comments, or if the team members aren't sure who is responsible for reviewing the content item.

The present technology can solve the above and other problems by displaying an access list and seen state information for content items stored and managed by a content management system. Advantageously, the present technology does not require team members to view or work on content items within the content management system—they can work on content items natively on their own computing device.

Figure 1:
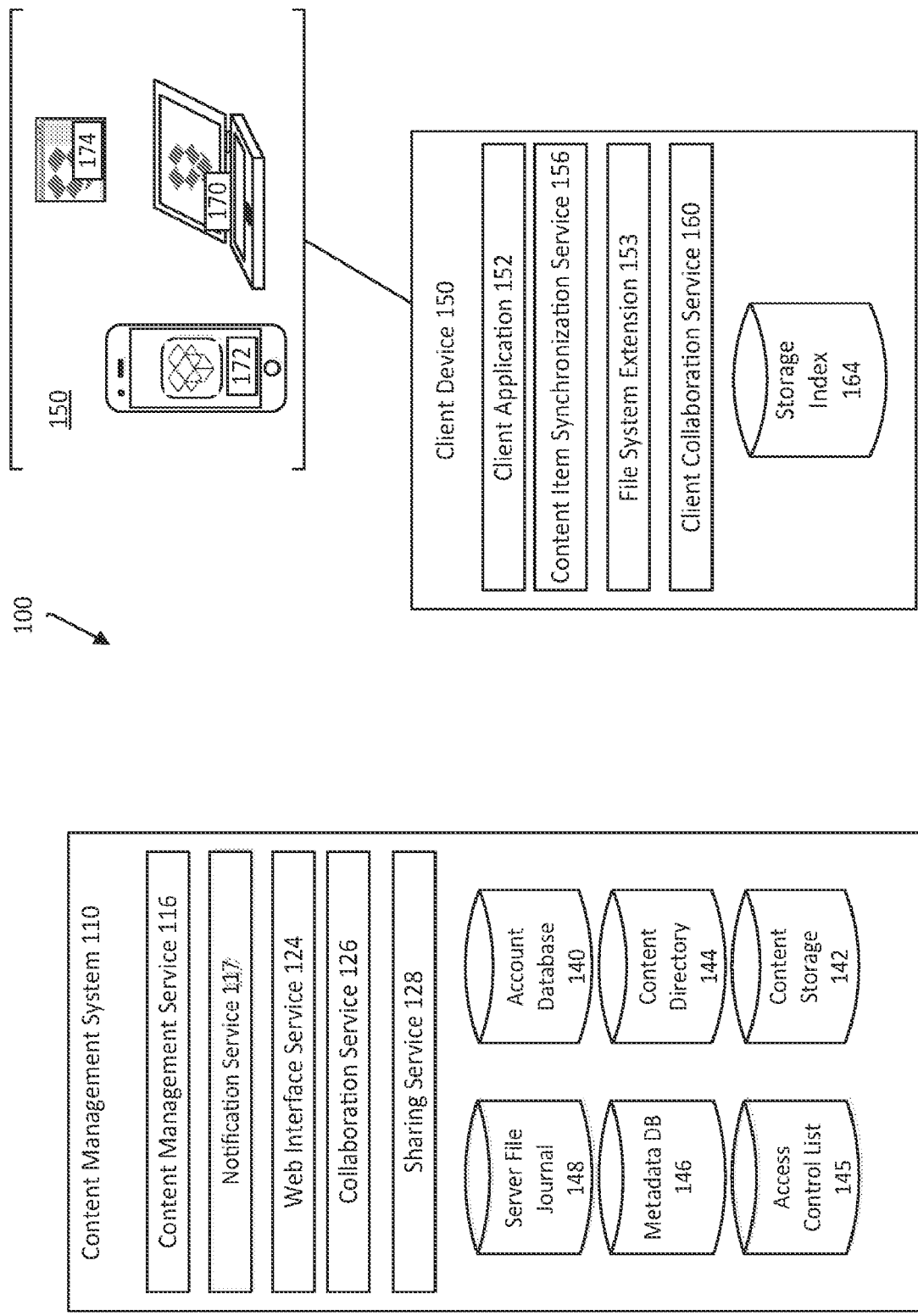
FIG. 1 illustrates an example system configuration of a content management system and client devices.

In some embodiments the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. In some embodiments, the user account identifier can automatically be added to access control list database associated with the content item because the user account has membership in a group, such as a team, that has access to the content item. Sharing service 128 can also remove user account identifiers from a content entry to restrict a user account's access to the content item. Sharing service 128 can record content item identifiers, user account identifiers given access to a content item, and access levels (e.g., read-only, read-write, comment only, etc.) in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notification service 117 when client device 150 is accessing the content item. Notification service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146. In some embodiments, the storage of such comments can be stored separately from seen state information.

Collaboration service 126 can originate and transmit notification for users. For example, a user can mention another user in a comment and collaboration service 126 can send a notification to that user that he has been mentioned in the comment. Various other content item events can trigger notification, including deleting a content item, sharing a content item, etc.

Collaboration service 126 can provide a messaging platform whereby users can send and receive instant messages, voice calls, emails, etc.

Collaboration Content Items

Collaboration service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

In some embodiments system 100 can be used to provide presence, access, and seen state information in association with a content item. Presence refers to informing a first account, that a second account is currently accessing the same, shared content item as the first account is currently accessing. Seen state refers to informing a first account of a history of views by other accounts of a shared content item. Access refers to informing a first account of access rights held by other accounts having access to a shared content item.

Figure 2:
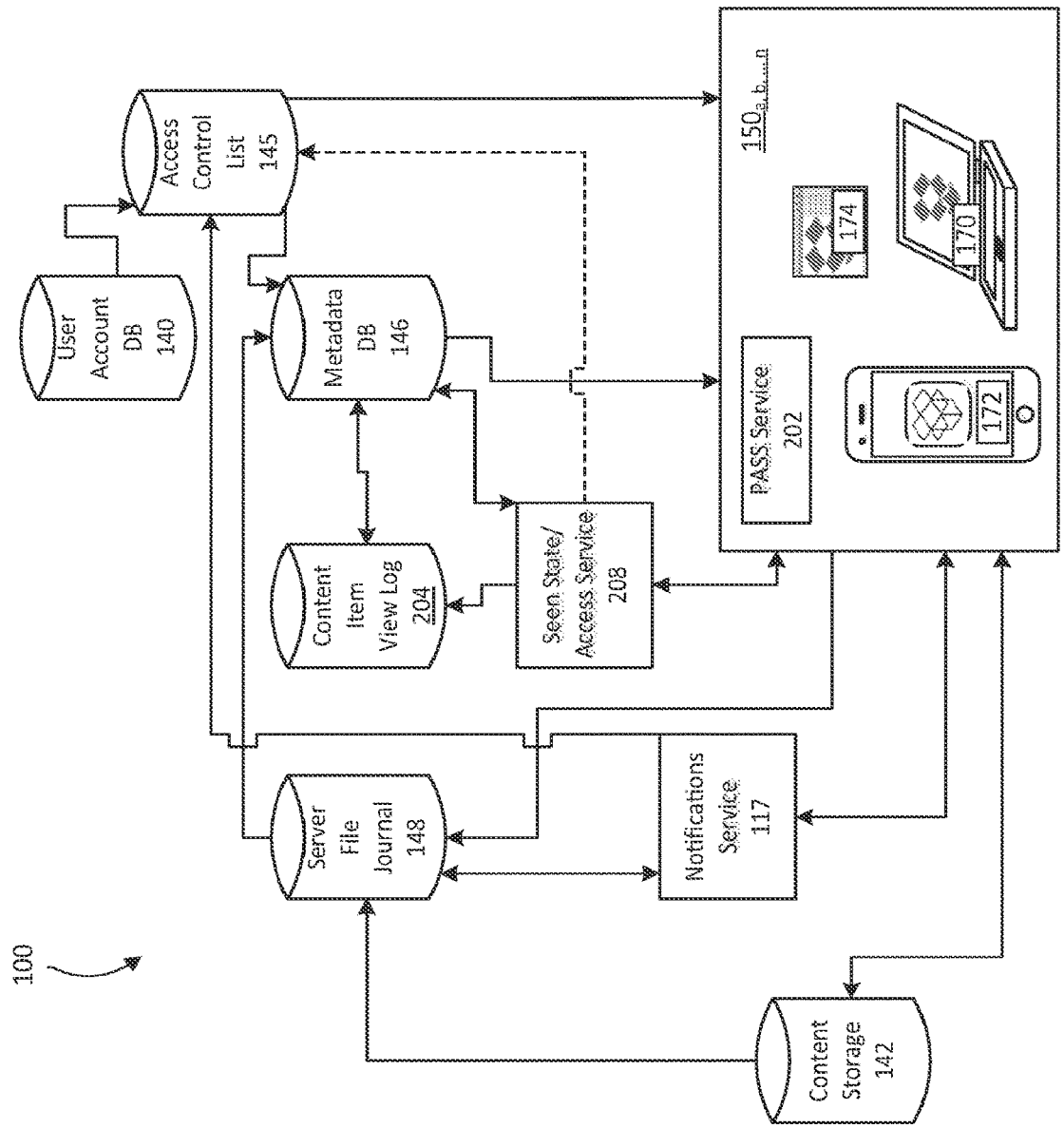
FIG. 2 illustrates an example system configuration of a content management system and client devices.

FIG. 2 illustrates an example system embodiment for recording and providing presence, access, and seen state information for content items. FIG. 2 illustrates system 100, but in greater detail, showing additional elements useful in recording and providing presence, access, and seen state information for content items.

Seen State

Figure 3:
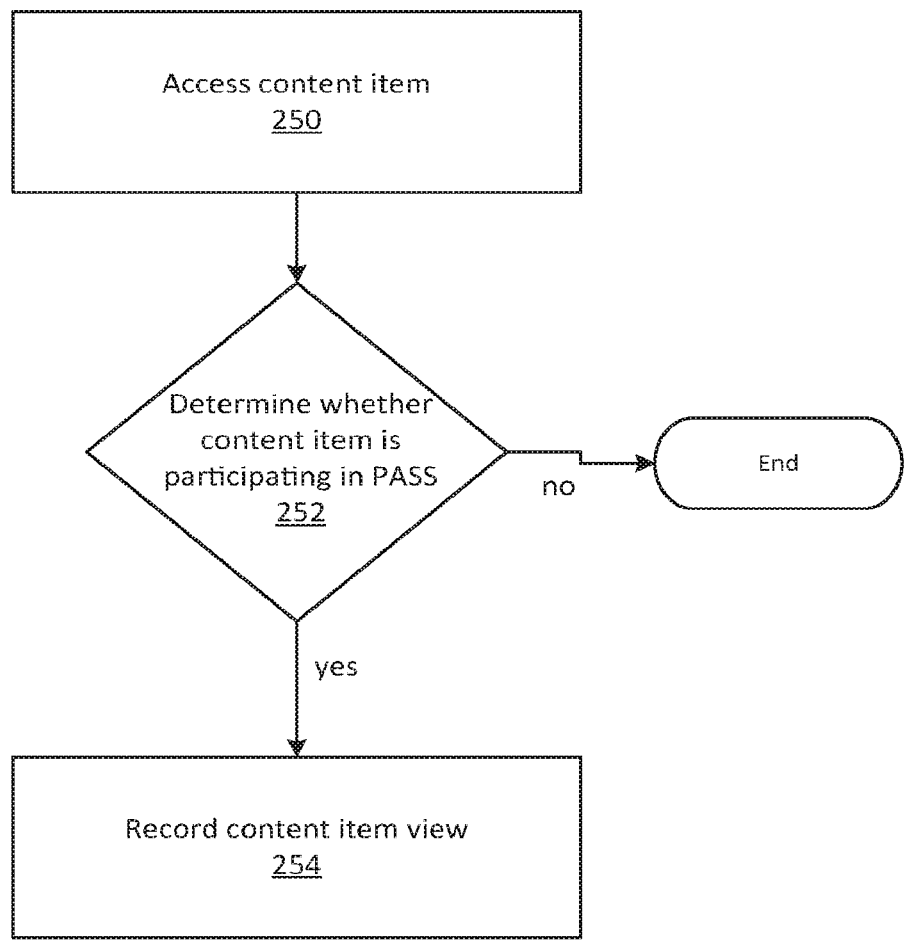
FIG. 3 illustrates an example method of recording seen state information from a content item view on a client device.

FIG. 3 illustrates an example method for recording seen state information. In some embodiments, first client device 150*a* accesses and opens 250 a first content item stored on its local storage and accessible using its own file system. The first content item is also managed by client application 152, and synchronized with a copy of the first content item stored in content storage 142 at content management system 110.

After first client device 150*a* opens the first content item, (whereby the first content item is presented (viewed) by a user of first client device 150*a*) Presence, Access, and Seen State (PASS) Service 202 determines 252 if the first content item is participating in the PASS feature. Further details on whether a content item is participating in PASS will be addressed below, but some factors are whether the content items is a shared content item, and access policies associated with the content item.

After PASS Service 202 determines that the first content item is eligible for PASS, PASS Service 202 records 254 a view of the first content item with content management system 110. In some embodiments, PASS Service 202 can send a content item view message indicating that the first content item has been viewed to Seen State/Access service 208 of content management system 110. Seen State/Access service 208 can receive the content item view message, which includes at least a content item ID of the first content item and a time stamp of when the content item view occurred on first client device 150*a*, and record data regarding the content item view in content item view log 204.

In some embodiments additional information can be included in the content item view messages including, e.g., an account identifier, a client device identifier, how client items 150*a* accessed the content item (i.e., through a content item downloaded from a shared link, or by direct access of the first content item through the file system of client device 150*a*, etc.), etc.

In some embodiments, some information regarding the content item view on client device 150*a* can also be stored in metadata database 146. In some embodiments, information regarding content item views can be sent from content item view log 204, or from Seen State/Access Service 208. In some embodiments, metadata database 146 can store a pointer(s) or reference(s) to information regarding content item views stored in content item view log 204.

While FIG. 3 was described with respect to client device 150*a* accessing a content item stored in its local storage and accessible using its own file system, FIG. 3 is also applicable to embodiments wherein the content item is accessed using a web browser in communication with web interface service 124. In such embodiments, the copy of the content item being accessed is the content management system 110's copy that is stored in content storage 142. Seen State/Access Service 208 can receive a content item view message from web interface service 124 (not shown in FIG. 2) (instead of from PASS service on a client device 150).

Figure 4:
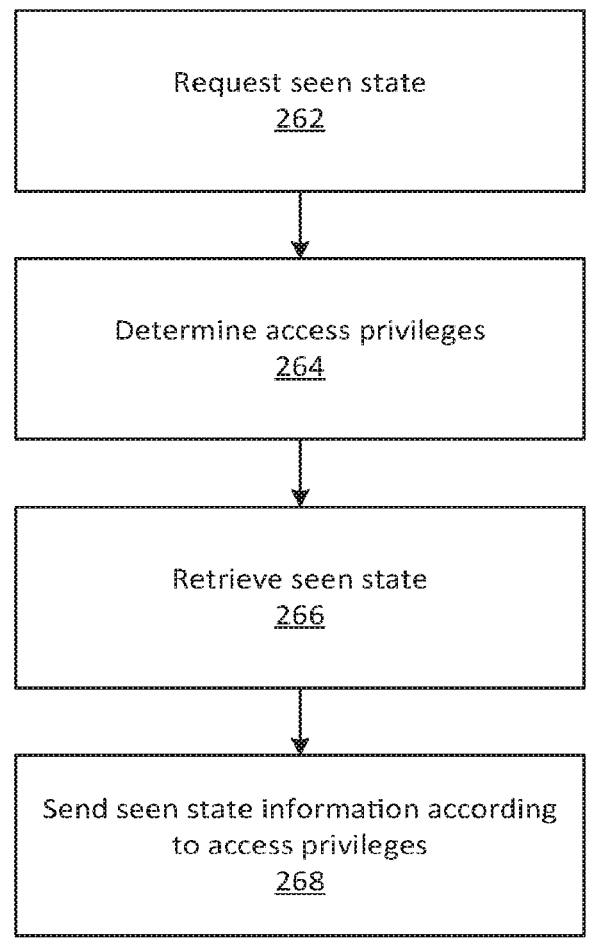
FIG. 4 illustrates an example method of providing seen state information in association with a content item on a client device.

FIG. 4 illustrates an example method of presenting information about one or more past views of a content item. In some embodiments the content item is a shared content item. Client device 150*b* can be accessing a content item stored in its local storage and accessible using its own file system. PASS Service 202 can request 262 seen state data from Seen State/Access Service 208 of content management system 110. In some embodiments, request 262 can identify any of a content item identifier, account identifier, client device identifier, method of content item access, etc.

Seen State/Access Service 208 can determine 264 access privileges for the requesting account for the seen state information (discussed further below) by requesting access rights information from one or both of access control list 145 and/or metadata database 146. After determining 264 access privileges Seen State/Access Service 208 can receive 266 seen state information from metadata database 146, and present 268 the seen state information to PASS Service 202 of client device 150*b*. The seen state information can be presented 268 by sending the seen state information to the PASS Service 202 to be displayed by client device 150*b*, or by transmitting this information through Web Interface Service 124 for display in a webpage viewed on client device 150*b*.

In some embodiments, seen state information is only pertinent to content items shared between at least two accounts. In one example, seen state can inform a first user accessing a shared content item in connection with using a first account, of whether or not a second user having access to the shared content item through a second account, has viewed the shared content item. For example, client device 150*b*, associated with a first account, can receive information that client device 150*a*, associated with a second account, has viewed a shared content item.

In some embodiments, seen state information can be provided for content items that are not shared. In such embodiments, the seen state information is a record of past content item views by the account having access to the not-shared content item. It can also be useful to store seen state information for content items that are not shared because the content item may become shared, and reflect the interactions with the file, pre-sharing.

Presence

Figure 5:
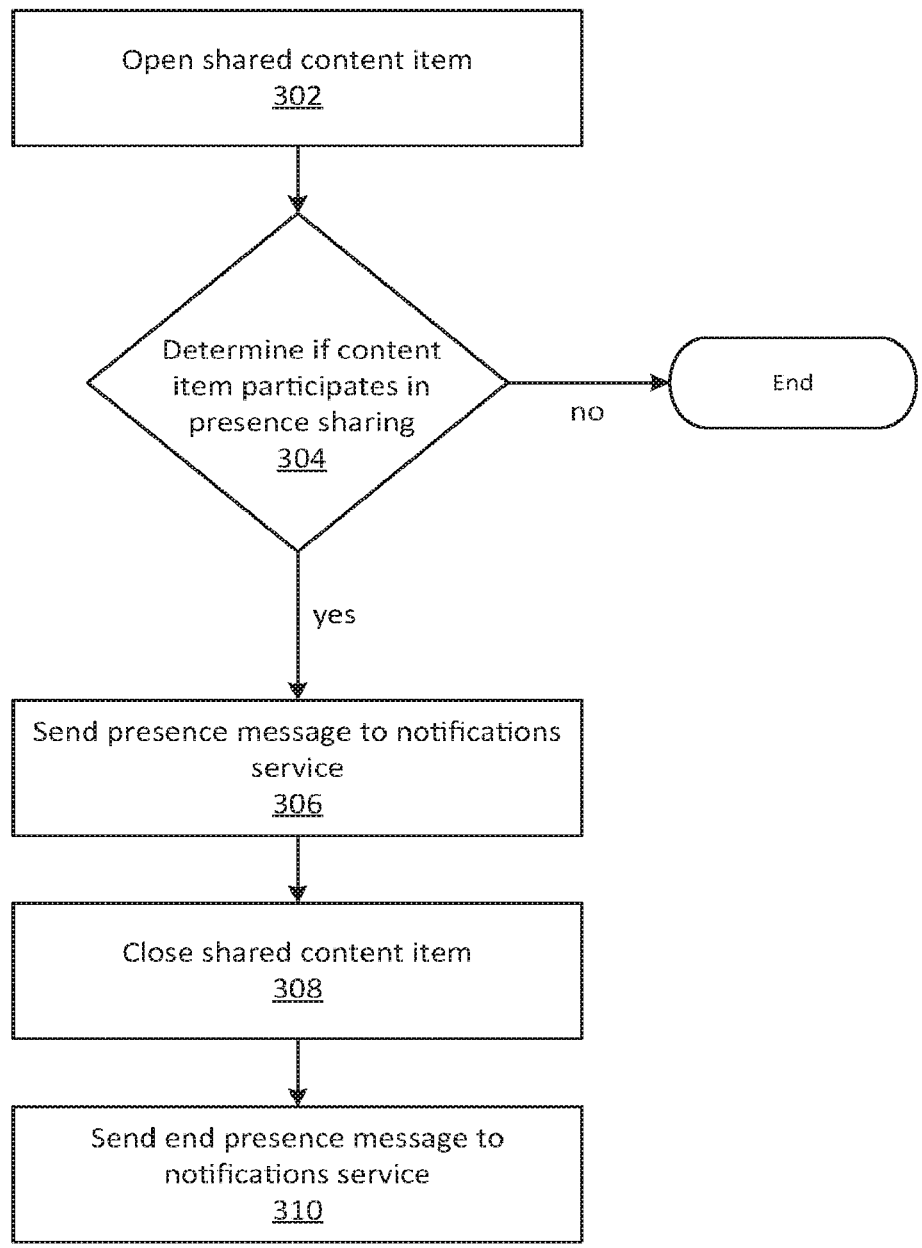
FIG. 5 illustrates an example method for receiving presence information from a client device.

FIG. 5 illustrates an example method for sending presence information from a client device to notification service 117 of content management system 110. Client device 150 can open 302 a shared content item, and PASS Service 202 can determine 304 if the content item participates in presence sharing. Details regarding when a content item participates in presence sharing will be addressed further below. However, in one example the content item participates in presence sharing when the content item is a shared content item. When PASS Service 202 determines 304 that the content item participates in presence sharing, PASS Service 202 sends 306 a presence message to notification service 117. In some embodiments the presence message includes an account identifier and a content item identifier. The presence message may also include other information regarding the content item including content item metadata, and information regarding the method of access of the content item by the client device.

Notification service 117 can record presence messages to keep track of when an account is currently accessing the content item. When the content item is closed 308, client device 150 sends an end presence 310 message to the notification service 117. After receiving the end presence message, the notification service 117 can close out the previous record indicating that the account is currently accessing the content item, thus removing any record of the account currently accessing the content item.

In some embodiments, such as when a content item is viewed on client device 150 accessing the content item through a web browser, recording that a content item has been closed can require the use of a browser based service worker API. The service worker API allows an open tab to pass a task to the web browser to complete after the tab has been closed. In the present example, a tab accessing a document from web interface service 124 can instruct the service worker API to notify notification service 117 that a content item is no longer being viewed after the tab is closed.

In some embodiments, a seen state record can be updated to reflect when a content item was closed. Generally, a content item view is recorded 254 when a content item is opened. While the content item is opened, PASS information can reflect presence information. When the content item is closed, the content item view time stamp can be updated to reflect when the content item was closed.

In some embodiments, it can be possible to reflect that an account is present in a content item, but that the account is idle. One effect of displaying presence information associated with a content item is that other users might be hesitant to edit the content item for fear of creating a conflicted version. However, other users might take a different action if they understood that a document was open on a first user's client device, but isn't in a window that is currently in focus—as reported by a client device—or that a user hasn't scrolled, saved, or otherwise interacted with a content item in a period of time. In such embodiments, presence information can be displayed showing a present, but idle state.

In some embodiments, a single user account may have a content item open in multiple simultaneous sessions. If the content item is open in any one of the simultaneous sessions, it won't be reported that the user account has ended its presence until the last of the sessions has closed.

Figure 6:
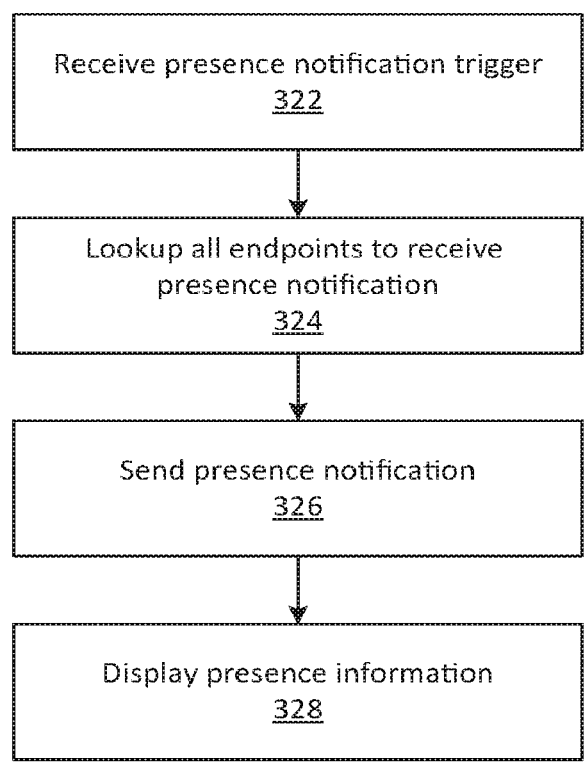
FIG. 6 illustrates an example method for sending and displaying presence information in association with a content item on a client device.

FIG. 6 illustrates an example method of sending recorded presence information to one or more endpoints. For example, notification service 117 can receive 322 a presence notification trigger. A notification trigger can be any information received by notification service 117, or in some embodiments a trigger can be a request for notifications. For example, when notification service 117 receives information to be transmitted to accounts having access to a shared content item, notification service 117 can push the received information to client devices associated with accounts having access to the content item.

In some embodiments, only certain types of client devices 150 receive push notifications, and some client devices may receive push notifications from notification service 117 conditionally. For example, in some embodiments, only client devices that are currently running client application 152 receive push notifications. Devices such as laptops and desktops might run client application 152 persistently (whether in background or foreground). These devices are often characterized by having a file system that can be accessed by all applications of this type of client device. In contrast, a client device accessing content management system 110 using a web browser will only receive notifications when logged into content management system 110. In some embodiments, a client device logged into content management system 110 using a web browser can register itself with notification service 117 when it is accessing a shared content item so that it can be registered to receive notifications regarding the content item. In some embodiments, the client device is a mobile computing device which is characterized by having client application 152 stored thereon, but often when not in an active use, client application 152 may hibernate and not be available to receive notifications unless the notifications are received through integration with a messaging service provided by the operating system. As such, whether notifications are to be sent to a mobile computing device is dependent on policies of client application 152 and client device operating system. However, for the purposes of the present disclosure, notifications can be received by a client device using either a model similar to laptops and desktop computing devices, or a mobile similar to web access, or a hybrid of both models.

Notification service 117 can lookup 324 all end points to receive presence notification for the content item by requesting all accounts that have access to the shared content item and client devices associated with the accounts from access control list 145. In some embodiments, the notification service can request account and client device information from another source within content management system 110.

After determining which client devices should receive the notification, notification service 117 sends a presence notification 326 to the client device. The presence notification can indicate that a shared content item is open on at least one client device 150.

Once received by a client device 150, the respective client device 150 can determine whether to present the presence information. In some embodiments, presence information is only displayed 328 by the respective client device 150 when the content item to which the presence information pertains is also open on the respective client device 150.

In this way, two client devices, each associated with a different account, and each viewing the same shared content item, can present 328 notifications in association with the shared content item while another account is accessing/viewing the shared content item.

Access

Access is relevant to the present technology in at least two ways. First, the present technology surfaces an Access Control List 145 with respect to a shared content item to be displayed and viewed along with seen state and presence information. Second, access is concerned with how much information should be accessible and to whom.

A content item must both be eligible and enrolled to utilize the presence, access, and seen state (PASS) features.

In some embodiments, a content item must at least be shared, either at the content item level, at the collection level, or at a team level. Information regarding seen state and access can be stored in multiple places. For example, seen state information can be stored in content item view log 204 and/or in metadata database 146. Access information can be stored in access control list 145 and/or in metadata database 146. In the following description of the technology, a reference to storing seen state or access privilege information can refer to storing the data in any of content item view log 204, metadata database 146, access control list 145, or any other database data structure within content management system 110. Reference to one or more of these databases or data structures below should not be considered exclusive, and data can be stored different databases in the alternatives or redundantly.

When a content item (or content items) are enrolled in PASS at the team level, content management system 110 can record a PASS status at the team level in metadata database 146. The PASS status at the team level can indicate either unrestricted team access or editor only team access, or some other access policy. In some embodiments, every content item associated with the team inherits the team level access rights.

In some embodiments, only team administrators can modify PASS team level rights. An administrator can view PASS settings in an administrator console of content management system 110. Team PASS settings can include e.g., "unrestricted team access," "editors only access," "PASS disabled," etc.

The PASS status at the shared namespace level can also be recorded in metadata database 146. In some embodiments, the pass status at the namespace level can be "enabled" or "not enabled" by setting a flag. Every subfolder and every content item can inherit the pass status properties for the namespace. In some embodiments, shared namespaces will have PASS enabled by default. In some embodiments, only a user with sufficient access privileges can edit PASS settings, such as a user that created the namespace (an Owner), or a user with edit rights.

If at the content item level, and PASS is not already enabled due to enrollment from the content item being associated with a team, or being within a shared namespace, PASS can be enabled by storing an enabled status flag within the metadata database 146 for the content item. In some embodiments, only a user with sufficient access privileges can edit PASS settings, such as a user that created the content item (an Owner), or a user with edit rights.

Figure 7:
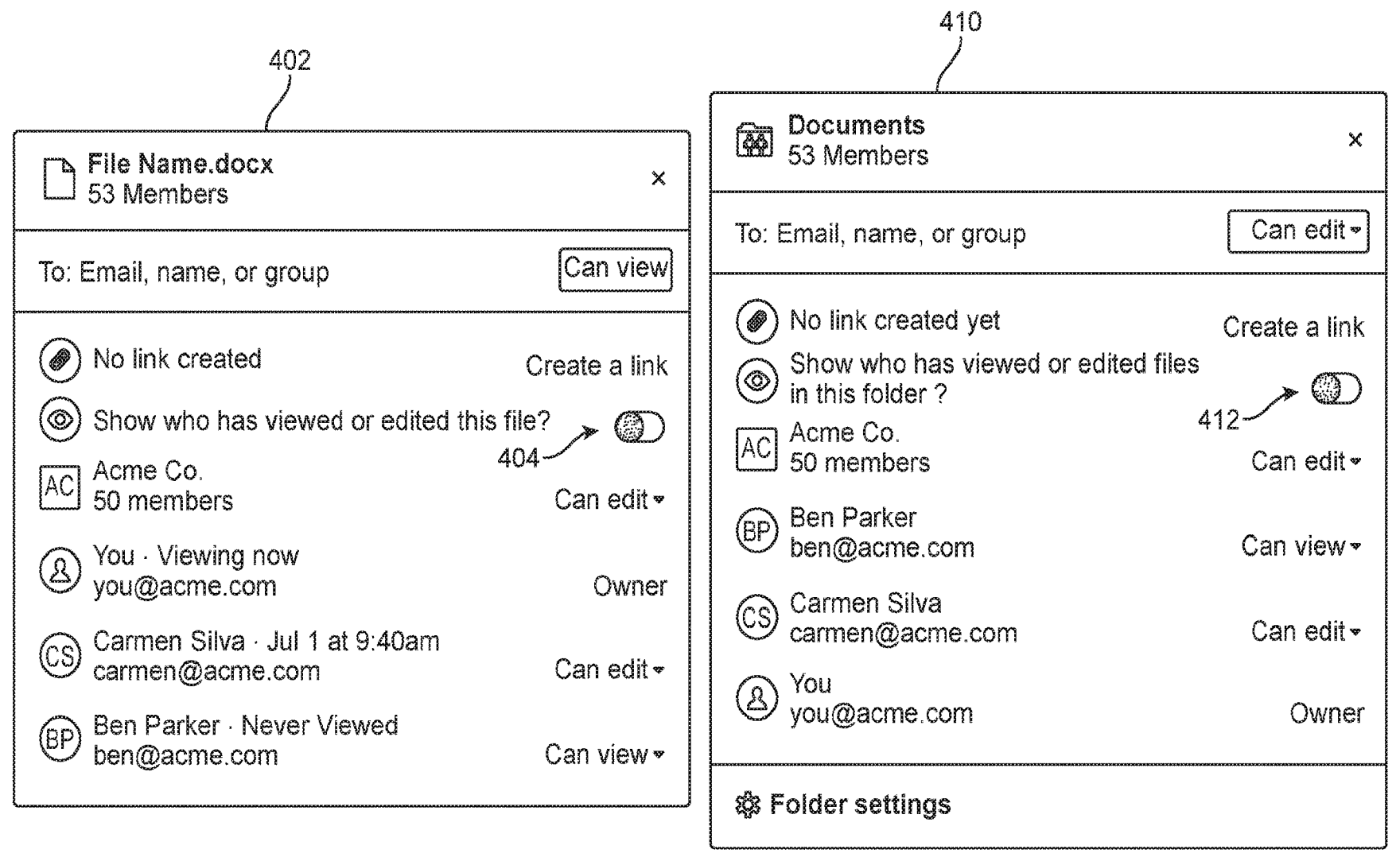

FIG. 7 illustrates an example user interface for enabling PASS for a content item or folder. Graphical user interface 402 illustrates a content item sharing interface for sharing the content item "File Name.docx". A toggle switch 404 can be presented within interface 402 to toggle PASS on or off. Similarly, graphical user interface 410 illustrates a namespace or collection item sharing interface for sharing collection "Documents." A toggle switch 412 can be presented within interface 410 to toggle PASS on or off.

It will be appreciated by those of ordinary skill in the art that there can be any number of variations in a specific access policy. As such, each possible variation will not be addressed herein. However, an example access policy for PASS can include accounts having roles of Team Members, Access Control List (ACL) Editors, ACL Commenters, ACL Viewers, Link Access Editors, Link Access Commenters, and Link Access Viewers.

Team Members can see each other's access state, seen state, and presence state for content items that are stored in one of the team's work namespaces. Team members that access a namespace, collection, or content item can be automatically added to the ACL.

ACL Editors, and ACL Commenters are users with accounts that are declaratively added to the ACL for a namespace, collection, or content item and given an access role. ACL Editors, and ACL Commenters can see access state, seen state, and presence state for all Team Members, ACL Editors, and ACL Commenters for the namespace, collection, or content item to which the ACL pertains.

ACL Viewers can't see any PASS information, but their access/seen/presence state can be seen by all Team Members, ACL Editors, and ACL Commenters for the namespace, collection, or content item to which the ACL pertains.

Link Access Editors, Link Access Commenters, and Link Access Viewers can't see any PASS info, and Team Members, ACL Editors, and ACL Commenters can only see their access/seen/presence state as anonymous activity.

Figure 8:
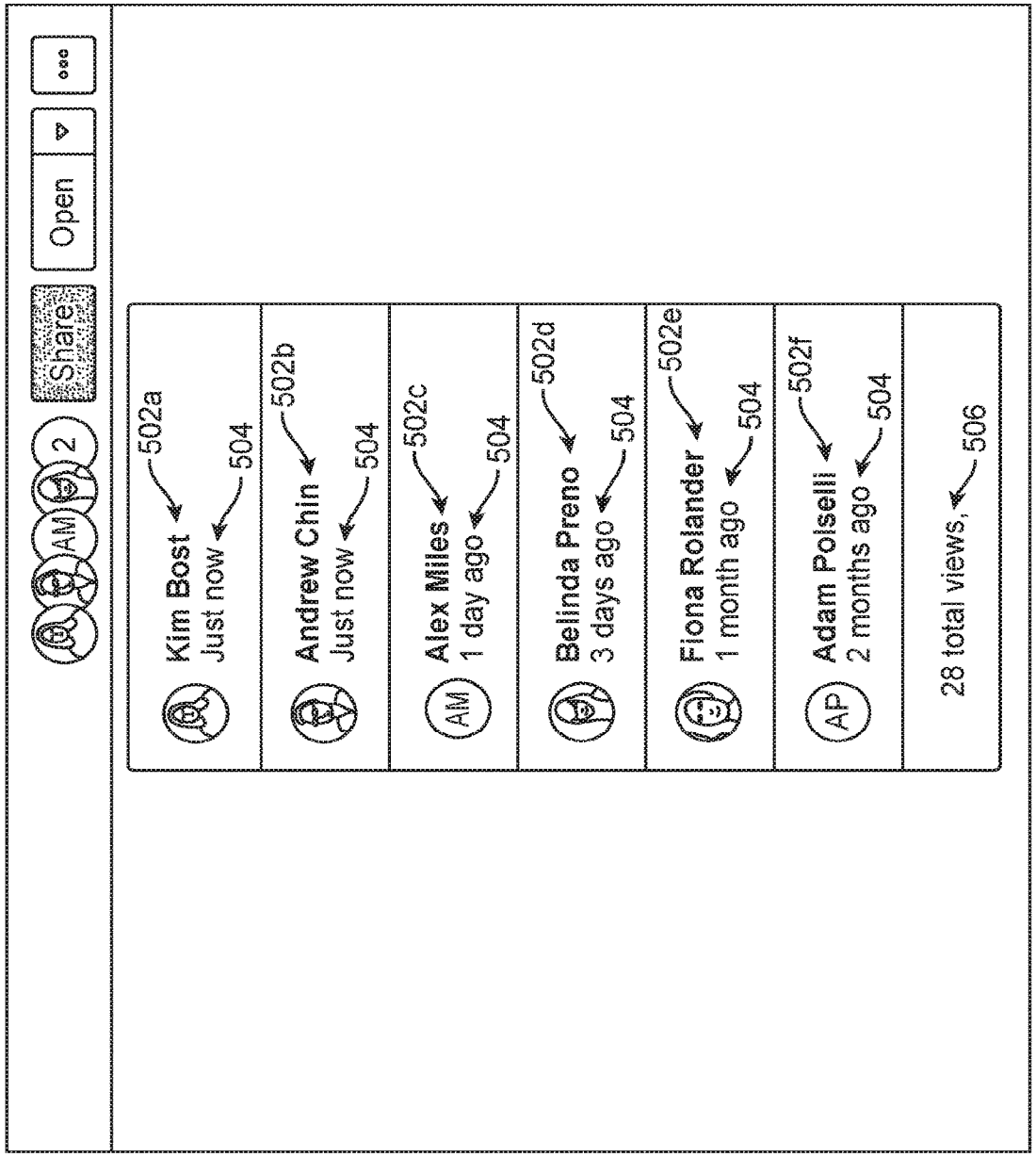
FIG. 8 illustrates an example graphical user interface for displaying seen state information in association with a content item on a client device.

FIG. 8 illustrates an example user interface presenting seen state information. Users 502*a, b, c, d, e, f* are each listed with their respective seen state 504 showing the last time they viewed the relevant content item. Additionally, the example user interface can also show the total number of views 506 for the content item.

Figure 9A:
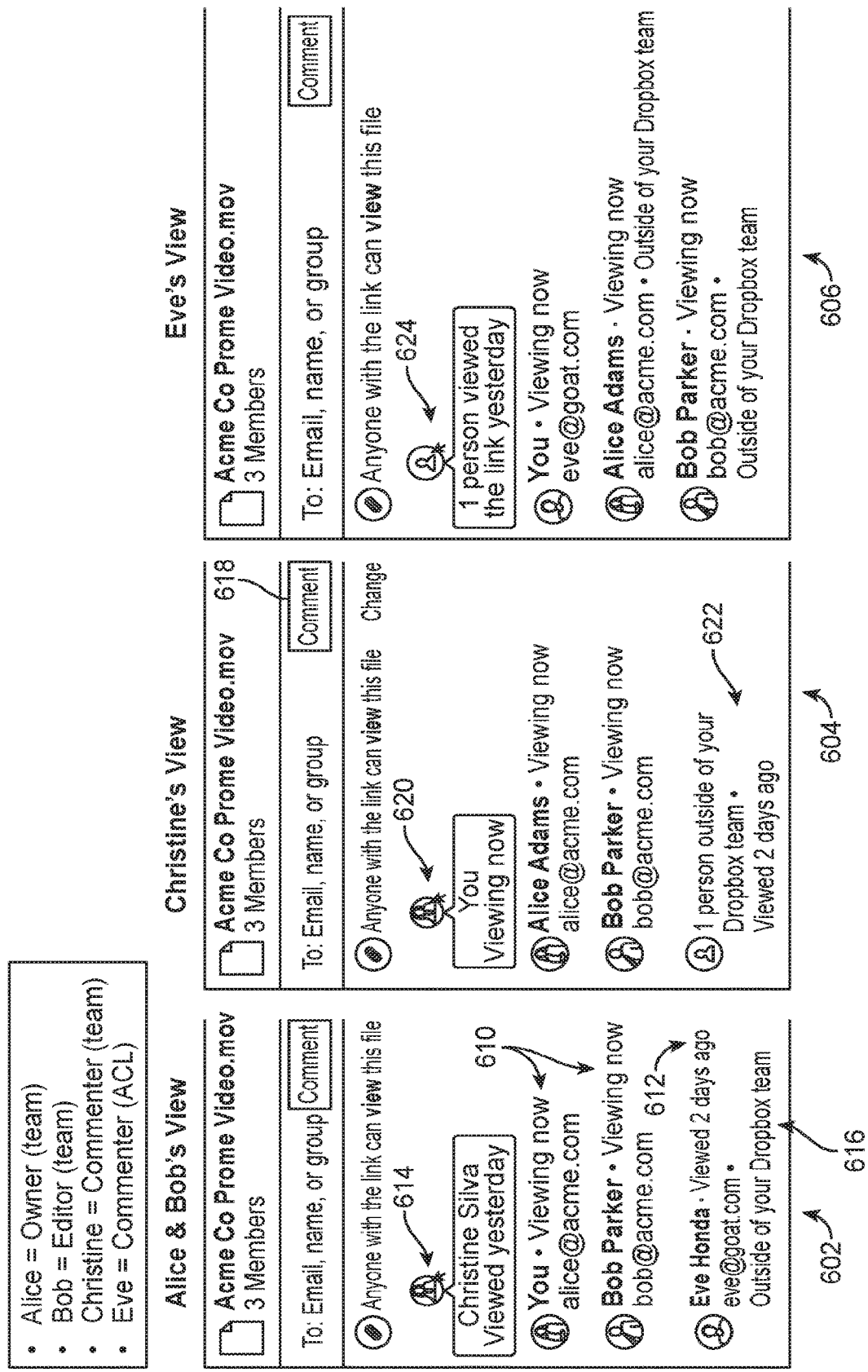
FIG. 9A illustrates an example graphical user interface for displaying an access control list with presences and seen state information to members of the access control list for a content item.

FIG. 9A illustrates example presence, access, and seen state (PASS) graphical user interfaces showing views for accounts or users having different access rights. In the example illustrated in FIG. 9A, Alice is on a team and is the owner of the content item (Acme C Promo Video.mov), Bob is on the team and is an editor, Christine is on the team and a commenter, and Eve is also a commenter but is not on the team. Eve's access rights come from being added to the access control list (ACL) for the content item.

Example graphical user interface 602 represents a PASS view that Alice (or Bob) would see. Alice can see those users that are currently viewing the content item. For example Alice and Bob are both considered "present" and their presence information 610 is displayed. Graphical user interface 602 also illustrates seen state information 612 for users/accounts that have previously viewed, but that are not present. Graphical user interface 602, also provides access information in that it displays a list of all users having access to the content item, and it also distinguishes which users have accessed via a link 614, which is Christine, in this example. Access information also distinguishes when a user is outside of the team 616.

Example graphical user interface 604 presents a PASS view that Christine would see as a commenter that is also on the team. Graphical user interface 604 displays much of the same information as graphical user interface 602, but differs in the Christine is not able to see Eve's identity 622. Since Eve is not on Christine's team, and Christine is not the owner of the content item, it cannot be assumed that Christine does not know Eve and as such Eve's identity is suppressed 622 in graphical user interface 604. Graphical user interface 604 illustrates Christine's presence 620 information, and offers Christine the ability to comment 618 in accordance with her access privileges.

Example graphical user interface 606 presents a PASS view that Eve would see as a commenter that has been given access via the ACL for the content item. Just as in graphical user interface 604, where Christine could not see Eve's identity, Eve cannot see Christine's identity 624.

FIG. 9B illustrates example PASS graphical user interfaces 656 showing views for accounts or users having different access rights. In this example, Alice is the owner of the content item and on the team, Bob has editor privileges and is on the team, Christine has commenter privileges and is on the team, while Fran is viewer and has gained access through a shared link.

Example graphical interfaces 652 and 654 are consistent, respectively, with Alice's PASS view 602 in FIG. 9A, and Christine's PASS view 604 in FIG. 9A. However, FIG. 9B illustrates that Fran does not have a PASS interface with ACL information since Fran has link access.

In some embodiments, accounts only having link access, or external commentators could be represented differently. For example, in some embodiments all accounts including those only having link access or commenter access could be shown to all users by name. In such embodiments, users can be notified that their name and seen state will be shown in association with a content item. In some embodiments, users accessing the content item using a shared link can be given access to register themselves in the ACL so that their identity and seen state can be recorded and displayed; this would be especially useful for users that do not have an account with content management system 110.

Figure 9C:
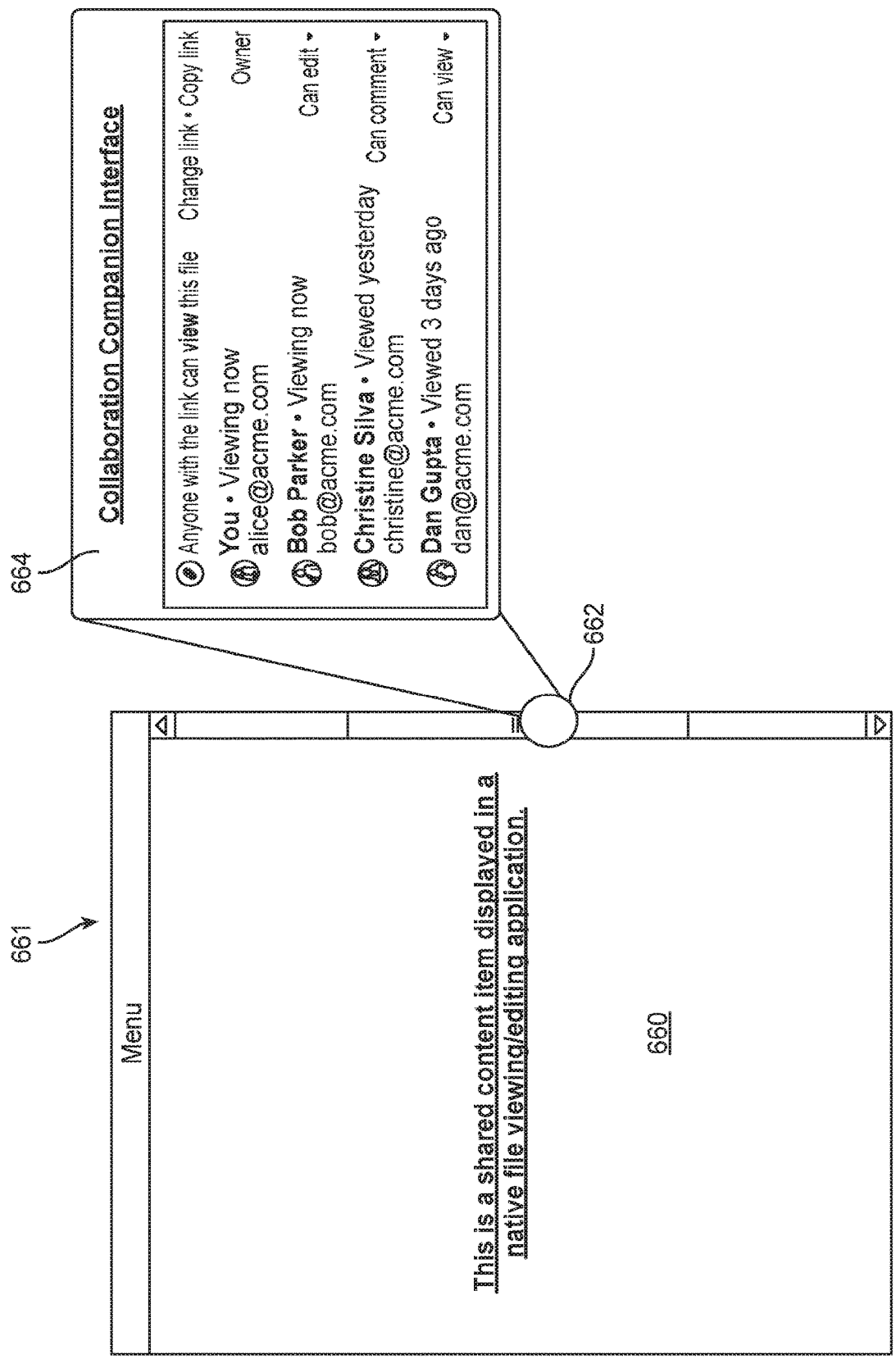
FIG. 9C illustrates another example view for accessing presence and seen state information.

FIG. 9C illustrates another example view for accessing PASS information. FIG. 9C illustrates a content item 660 that has been opened and viewed in a native application 661 on client device 150. For example, this could be a word processing document opened in a word processing application, or a pdf file viewed in a pdf viewer, etc. Application 661 is an application that can be launched from an applications launcher on client device 150 or by selecting the content item in a file explorer on client device 150 which automatically launches application 661. Application 661 may not natively integrate with content management system 110, but content management system 110 can be associated with collaboration companion application 662 which can surface a graphical user interface feature in association with application 661. Collaboration companion application 662 can be aware of actions being taken inside application 661 through use of APIs or through file system extension 153. Collaboration companion application 662 can present collaboration companion interface 664 which can display PASS information in association with content item 660.

Figure 9D:
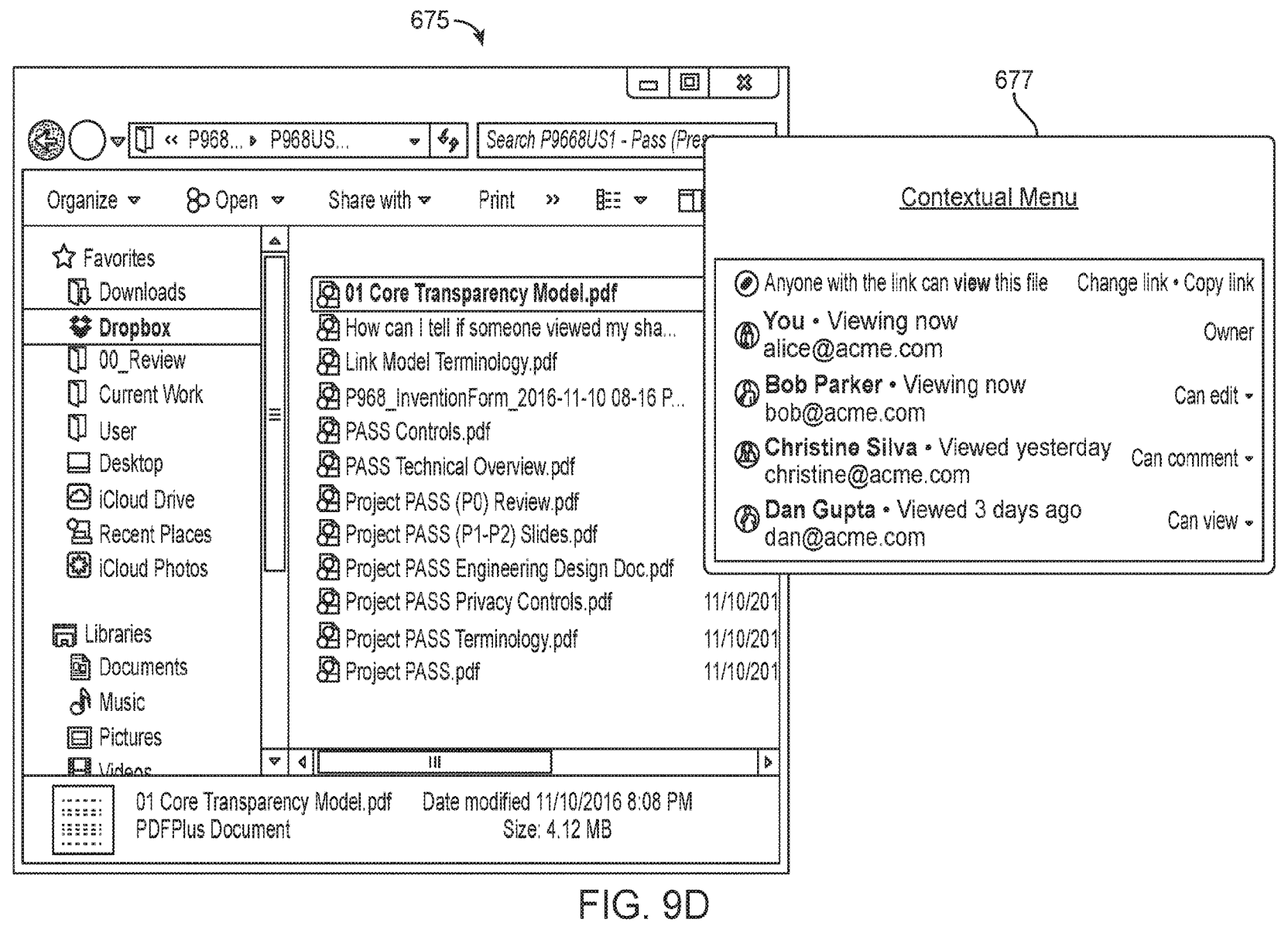

FIG. 9D illustrates another example view for accessing PASS information. FIG. 9D illustrates a file explorer 675. In some embodiments, file explorer 675 is a native application on client device 150 browsing content items stored locally on client device 150, while in some embodiments it could be a file explorer view in a web interface browsing content items stored at content management system 110. A content item or collection can be selected using file explorer 675 and a user can instruct file explorer 675 to open a contextual menu 677. Contextual menu 677 can request PASS information and display the information in contextual menu 677.

While the figures above illustrate one set of policies regarding access and display of PASS information, these are just examples and other policies can be used.

While the figures above only show PASS information associated with a content item, it should be appreciated that PASS information can also be shown in association with a collection.

FIG. 10A illustrates an example graphical user interface for changing visibility options for a content item 702 or collection 704. In graphical user interfaces showing the ACL for content item "file name.docx" 702, a visibility options link 706 is presented. Likewise, in graphical user interface showing the ACL for collection "Documents" 704, visibility options link 708 is presented. When a user selects link 706 or 708 using client device 150, user interface 710 can be presented, which presents an option for whether or not to provide seen state information in connection with the content item or collection.

Figure 10B:
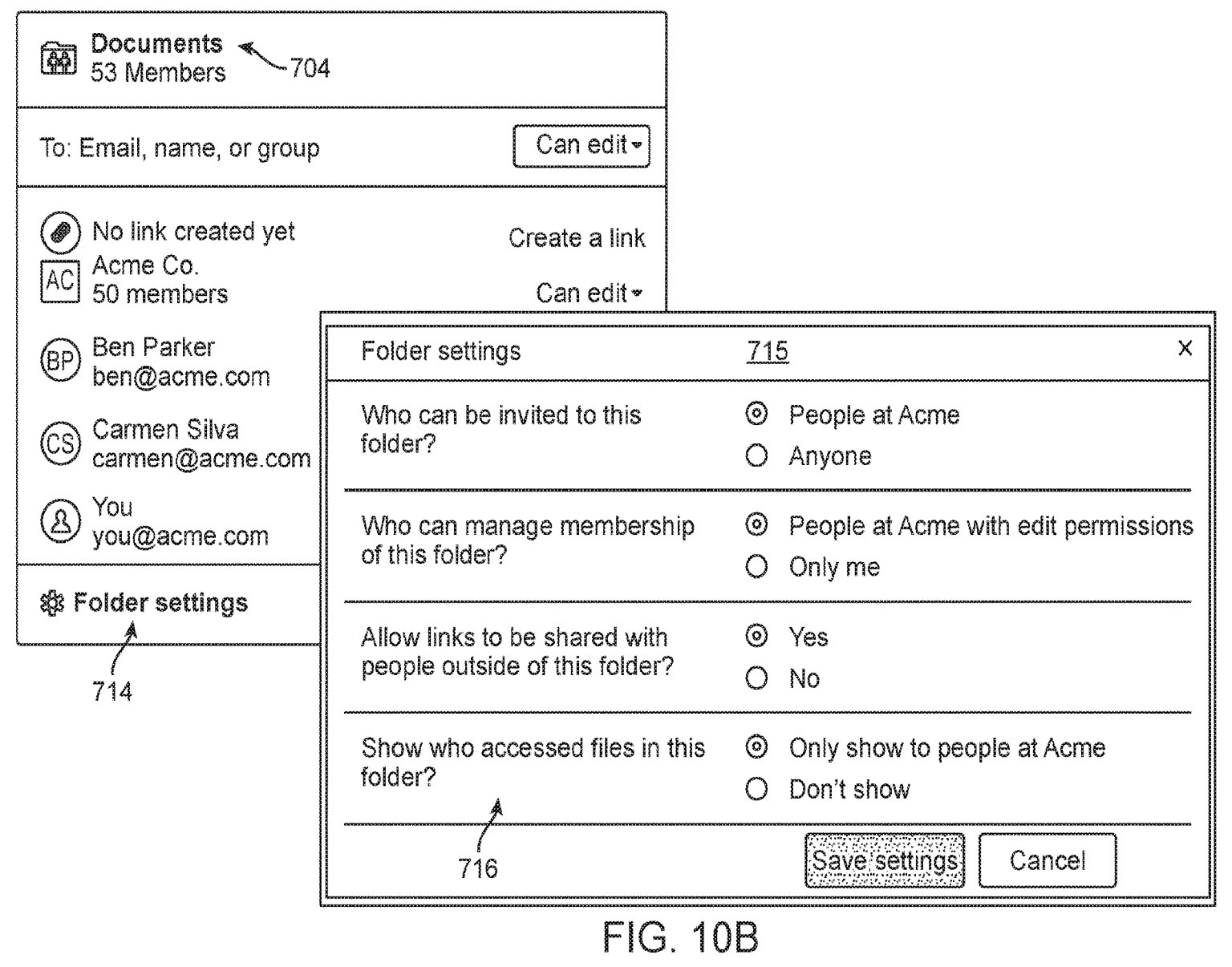

FIG. 10B illustrates an example graphical user interface for modifying options for a collection 704. The graphical user interface provides a link 714 that causes client device 150 to open graphical user interface 715 which presents selectable collection settings. Specifically, graphical user interface 715 presents option 716 to "show who accessed files in this folder?" Option 716 allows a collection owner or editor to make the ACL available or not.

Figure 10C:
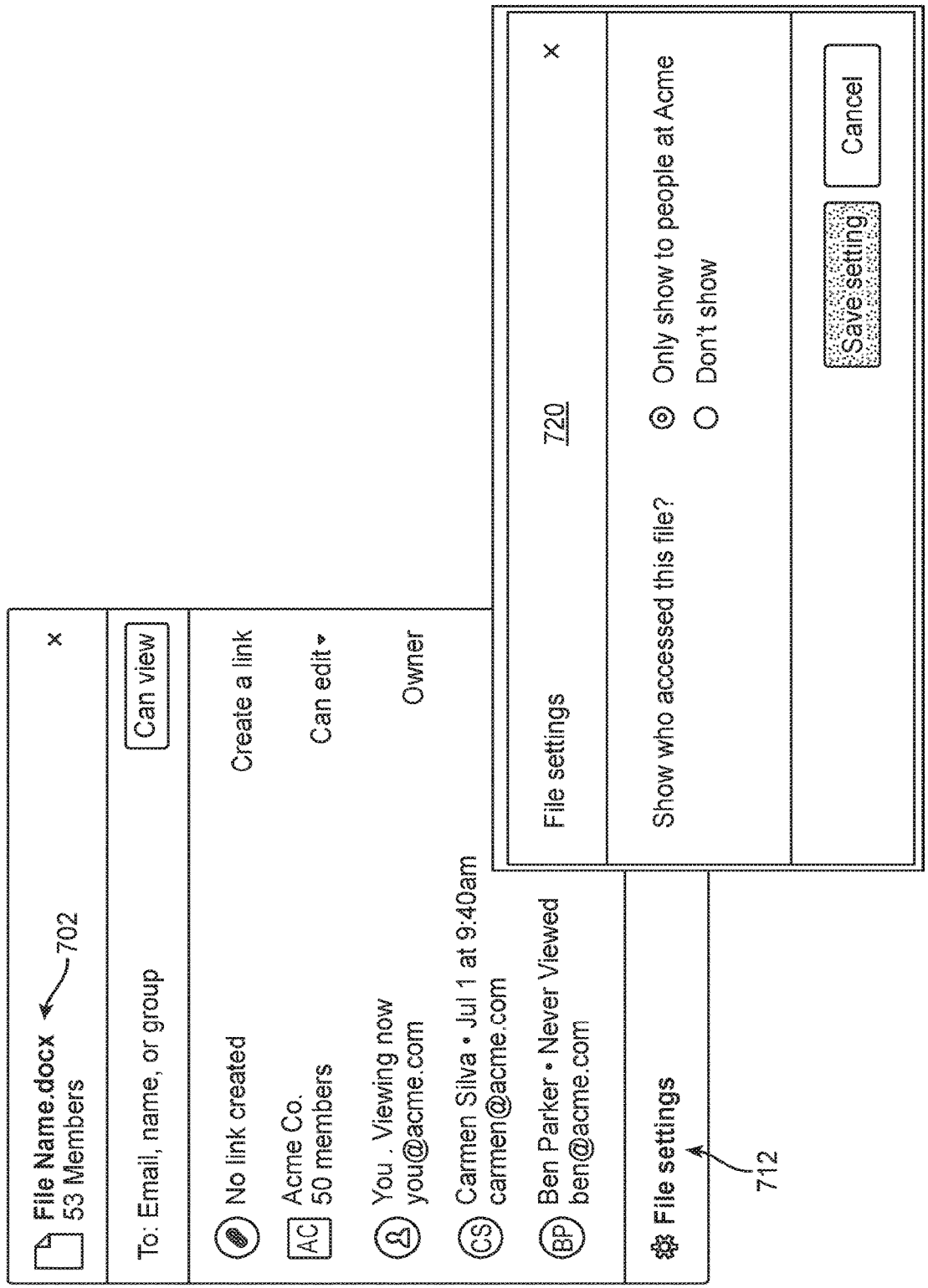
FIG. 10C illustrates an example graphical user interface for enabling or disabling views of authorized viewers of a content item.

FIG. 10C illustrates an example graphical user interface for modifying options for a content item 702. The graphical user interface provides a link 712 that causes client device 150 to open graphical user interface 720 which presents selectable content item settings. Specifically, graphical user interface 720 presents an option to "show who accessed this file?" This option allows a content item owner or editor to make the ACL available or not for the content item.

PASS is generally enabled on a collection level, a team, namespace, folder, etc. However, in some instances a user might want to provide different settings for a specific content item. In such instances, PASS settings can be recorded, as needed at the content item level. All other content items can inherit their PASS settings from a collection. In some embodiments when PASS settings for a collection change, so do all PASS setting for content items or sub-collections subordinate to the collection.

In some embodiments, PASS information for a content item can be inherited from another content item already known to content management system 110. For example, when a new content item is added to content management system 110, content management service 116 can run a deterministic hash function on the content item to generate a unique identification number for the content item, as addressed above. In some embodiments, the content item can be determined to be a copy of, or a new version of a content item that is already in the content storage 142. In such embodiments, the content item can be associated with PASS information for the content item that is already in content store 142 so that previous seen state information and access information can be preserved. In some embodiments, a prompt is provided to the account uploading the content item to ask if PASS information from another content item or version should be applied to the uploaded file.

In some embodiments Seen State/Access Service 208 can offer an API to allow third party products to receive and display PASS information.

Figure 11:
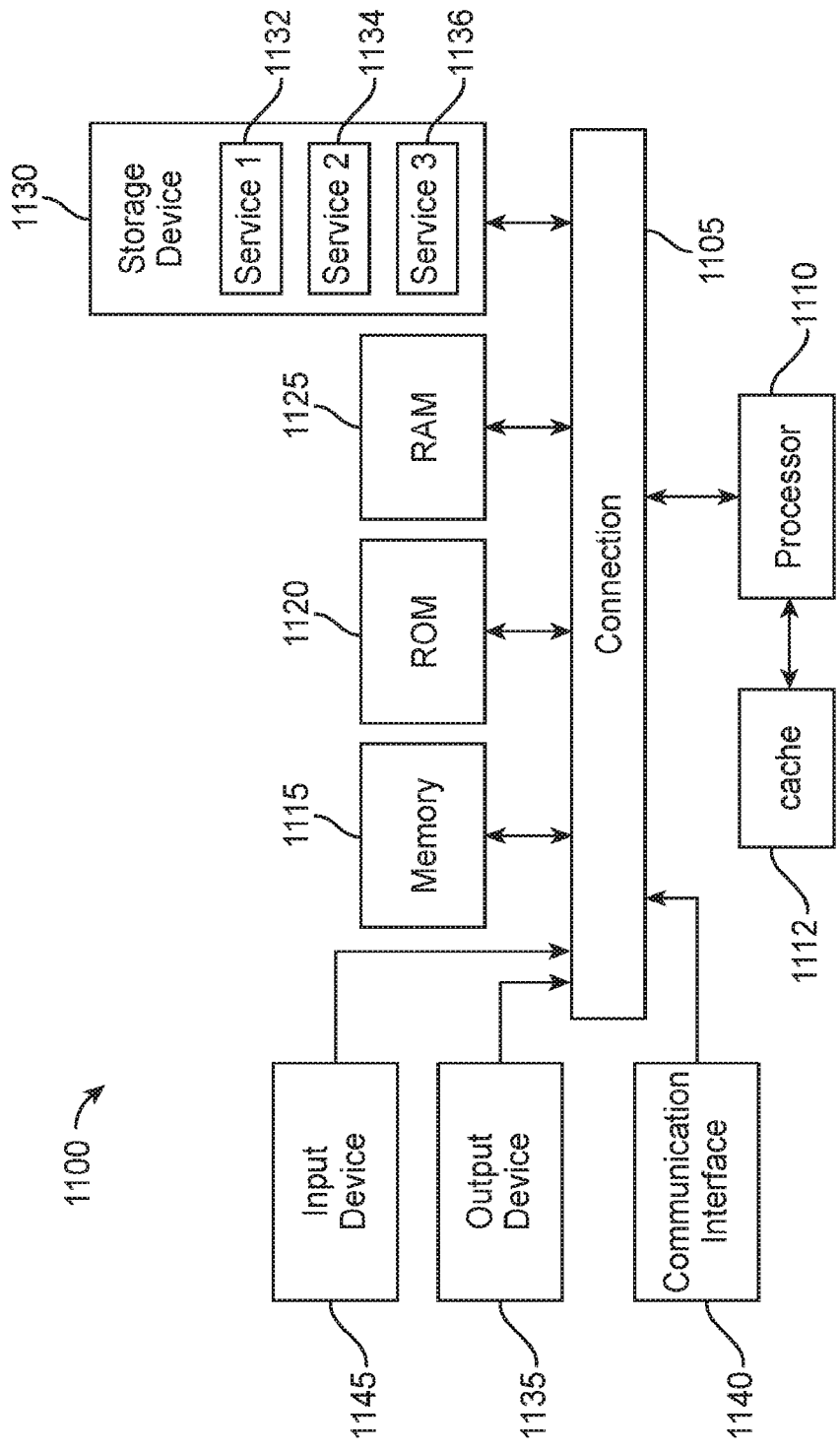
FIG. 11 illustrates an example system embodiment.

FIG. 11 illustrates an example computing system architecture 1100 wherein the components of the system are in communication with each other using a connection 1105. Connection 1105 can be a physical connection via a bus, or direct connection into processor 1110 such as in a chipset architecture. Connection 1105 can also be a virtual connection, networked connection, or logical connection.

In some embodiments 1100 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1100 includes at least one processing unit (CPU or processor) 1110 and a connection 1105 that couples various system components including the system memory 1115, such as read only memory (ROM) and random access memory (RAM) to the processor 1110. The system 1100 can include a cache of high-speed memory connected directly with, in close proximity to, or integrated as part of the processor 1110.

The processor 1110 can include any general purpose processor and a hardware service or software service, such as service 1 1132, service 2 1134, and service 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as the processor 1110, connection 1105, display 1135, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

accessing, by a first client device, a shared content item stored on a content management system;

sending, by the first client device to the content management system, a request for state information associated with the shared content item, wherein the request is associated with a first account on the content management system, the state information including presence information that informs the first account that a second account is accessing the shared content item when the first account is accessing the shared content item;

receiving, by the first client device from the content management system, a presence notification based on the request for state information that indicates that the shared content item is open by the second account;

receiving, by the first client device from the content management system, the state information and identifying information corresponding to the second account associated with a second client device that has accessed the shared content item;

determining, by the first client device, whether to present the state information by determining whether the shared content item is opened by the first account and the second account;

presenting, by the first client device, the state information associated with the shared content item based on the determining whether to present the state information, wherein the shared content item is accessed via a first application on the first client device, and wherein the state information is presented via an interface associated with a second application on the first client device, the second application being separate from the first application; and monitoring, via the second application, actions performed via the first application, the actions being associated with the shared content item, wherein presenting the state information comprises presenting, via the second application, one or more detected actions performed via the first application.

2. The method of claim 1, wherein the first application comprises a native application associated with the shared content item, and wherein the second application comprises one of a local client application or a browser application.

3. The method of claim 1, wherein accessing the shared content item comprises accessing a local version of the shared content item, and wherein presenting the state information comprises presenting the state information in conjunction with the local version of the shared content item, the local version of the shared content item being stored locally on a file system of the first client device.

4. The method of claim 1, wherein the identifying information received is at a level of detail that is varied based on information about at least one of the first account or the shared content item, the level of detail of the identifying information is based on team membership information for the first account, the team membership information specifying a team on which the first account is a member and a role on the team associated with the first account.

5. The method of claim 1, further comprising:
accessing, by the first client device, a local version of the shared content item, wherein the local version of the shared content item is stored on a file system of the first client device;

receiving, by the first client device from the content management system, additional identifying information corresponding to one or more accounts associated with one or more client devices that have accessed the shared content item, wherein the additional identifying information is at a level of detail that is based on information about at least one of the first account or the shared content item; and presenting, by the first client device, additional state information associated with the shared content item, wherein the state information comprises the additional identifying information, and wherein the additional state information is presented along with the local version of the shared content item.

6. The method of claim 1, wherein the identifying information comprises at least one of a first indication that the second account has viewed or edited the shared content item, a second indication that the second account is viewing the shared content item, or a third indication of one or more access permissions assigned to the second account for the shared content item.

7. The method of claim 1, further comprising presenting the shared content item at the first client device, wherein the state information and the shared content item are presented via a same application on the first client device.

8. A system comprising:
one or more processors; and
at least one non-transitory computer-readable medium having stored therein instructions which, when executed by the one or more processors, cause the system to:
access a shared content item stored on a content management system;
send, to the content management system, a request for state information associated with the shared content item, wherein the request is associated with a first account on the content management system, the state information including presence information that informs the first account that a second account is accessing the shared content item when the first account is accessing the shared content item;
receive, from the content management system, a presence notification based on the request for state information that indicates that the shared content item is open by the second account;
receive, from the content management system, the state information and identifying information corresponding to the second account associated with a client device that has accessed the shared content item;
determine whether to present the state information by determining whether the shared content item is opened by the first account and the second account;
present the state information associated with the shared content item based on the determination whether to present the state information,
wherein the shared content item is accessed via a first application on the system, and wherein the state information is presented via an interface associated with a second application on the system, the second application being separate from the first application; and
monitor, via the second application, actions performed via the first application, the actions being associated with the shared content item, wherein presenting the state information comprises presenting, via the second application, one or more detected actions performed via the first application.

9. The system of claim 8, wherein the first application comprises a native application associated with the shared content item, and wherein the second application comprises one of a local client application or a browser application.

10. The system of claim 8, the at least one non-transitory computer-readable medium having stored therein instructions which, when executed by the one or more processors, cause the system to:
present the shared content item, wherein the state information and the shared content item are presented via a same application.

11. The system of claim 8, wherein accessing the shared content item comprises accessing a local version of the shared content item, and wherein presenting the state information comprises presenting the state information in conjunction with the local version of the shared content item, the local version of the shared content item being stored locally on a file system of the system.

12. The system of claim 8, wherein the received identifying information is at a level of detail that is varied based on information about at least one of the first account or the shared content item, the level of detail of the identifying information is based on of team membership information for the first account, the team membership information specifying a team on which the first account is a member and a role on the team associated with the first account.

13. The system of claim 8, wherein the identifying information comprises at least one of a first indication that the second account has viewed or edited the shared content item, a second indication that the second account is viewing the shared content item, or a third indication of one or more access permissions assigned to the second account for the shared content item.

14. At least one non-transitory computer-readable medium having stored therein instructions which, when executed by one or more processors, cause the one or more processors to:

access, by a first client device, a shared content item stored on a content management system;

send, by the first client device to the content management system, a request for state information associated with the shared content item, wherein the request is associated with a first account on the content management system, the state information including presence information that informs the first account that a second account is accessing the shared content item when the first account is accessing the shared content item;

receive, by the first client device from the content management system, a presence notification based on the request for state information that indicates that the shared content item is open by the second account;

receive, by the first client device from the content management system, the state information and identifying information corresponding to the second account associated with a second client device that has accessed the shared content item;

determine, by the first client device, whether to present the state information by determining whether the shared content item is opened by the first account and the second account;

present, by the first client device, the state information associated with the shared content item based on the determination whether to present the state information, wherein the shared content item is accessed via a first application, and wherein the state information is presented via an interface associated with a second application, the second application being separate from the first application; and monitor, via the second application, actions performed via the first application, the actions being associated with the shared content item, wherein presenting the state information comprises presenting, via the second application, one or more detected actions performed via the first application.

15. The at least one non-transitory computer-readable medium of claim 14, wherein the first application comprises a native application associated with the shared content item, and wherein the second application comprises one of a local client application or a browser application.

16. The at least one non-transitory computer-readable medium of claim 14, storing instructions which, when executed by the one or more processors, cause the one or more processors to:

present the shared content item at the first client device, wherein the state information and the shared content item are presented via a same application at the first client device.

17. The at least one non-transitory computer-readable medium of claim 14, storing instructions which, when executed by the one or more processors, cause the one or more processors to:

access, by the first client device, a local version of the shared content item, wherein the local version of the shared content item is stored on a file system of the first client device;

receive, by the first client device from the content management system, additional identifying information corresponding to one or more accounts associated with one or more client devices that have accessed the shared content item, wherein the additional identifying information is at a level of detail that is based on information about at least one of the first account or the shared content item; and present, by the first client device, additional state information associated with the shared content item, wherein the state information comprises the additional identifying information, and wherein the additional state information is presented along with the local version of the shared content item.

* * * * *